(12) United States Patent
Miyoshi et al.

(10) Patent No.: US 9,041,809 B2
(45) Date of Patent: May 26, 2015

(54) PERIPHERY MONITORING APPARATUS

(75) Inventors: Hidehiko Miyoshi, Kariya (JP); Kazuya Watanabe, Kariya (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/122,006

(22) PCT Filed: May 31, 2012

(86) PCT No.: PCT/JP2012/064174
§ 371 (c)(1),
(2), (4) Date: Nov. 25, 2013

(87) PCT Pub. No.: WO2013/001978
PCT Pub. Date: Jan. 3, 2013

(65) Prior Publication Data
US 2014/0078306 A1 Mar. 20, 2014

(30) Foreign Application Priority Data
Jun. 27, 2011 (JP) .................. 2011-141910

(51) Int. Cl.
*H04N 7/18* (2006.01)
*G03D 13/00* (2006.01)
*B60R 11/04* (2006.01)
*B60R 1/00* (2006.01)
(Continued)

(52) U.S. Cl.
CPC . *B60R 11/04* (2013.01); *B60R 1/00* (2013.01); *B60R 2300/103* (2013.01); *B60R 2300/301* (2013.01); *B60R 2300/806* (2013.01); *B60Q 1/0023* (2013.01); *B60Q 1/24* (2013.01)

(58) Field of Classification Search
CPC .... B60R 1/00; B60R 11/04; B60R 2300/103; B60R 2300/301; B60R 2300/806; B60Q 1/0023; B60Q 1/24
USPC ........................................................ 348/148
See application file for complete search history.

(56) References Cited

U.S. PATENT DOCUMENTS

2004/0201674 A1 10/2004 Miyazaki et al.
2007/0025596 A1 2/2007 Ravier et al.

FOREIGN PATENT DOCUMENTS

| | | |
|---|---|---|
| EP | 1 724 153 A1 | 11/2006 |
| JP | 2003-23623 A | 1/2003 |
| JP | 2004-255903 A | 9/2004 |

(Continued)

OTHER PUBLICATIONS

International Search Report for PCT/JP2012/064174 dated Sep. 4, 2012.

(Continued)

*Primary Examiner* — Hee-Yong Kim
(74) *Attorney, Agent, or Firm* — Sughrue Mion, PLLC

(57) ABSTRACT

A periphery monitoring apparatus capable of photographing a vicinity of a vehicle without impairing the outer appearance of the vehicle includes a light source configured to be provided in the vehicle for illuminating the periphery of the vehicle, and a camera photographing a condition of the periphery of the vehicle with an optical axis changed by a mirror toward the underside of the circumferential edge of the vehicle illuminated by at least a portion of light irradiated from the light source reflected by the mirror configured to be disposed on the outer side of the circumferential edge of the vehicle.

7 Claims, 6 Drawing Sheets

Figure 1:
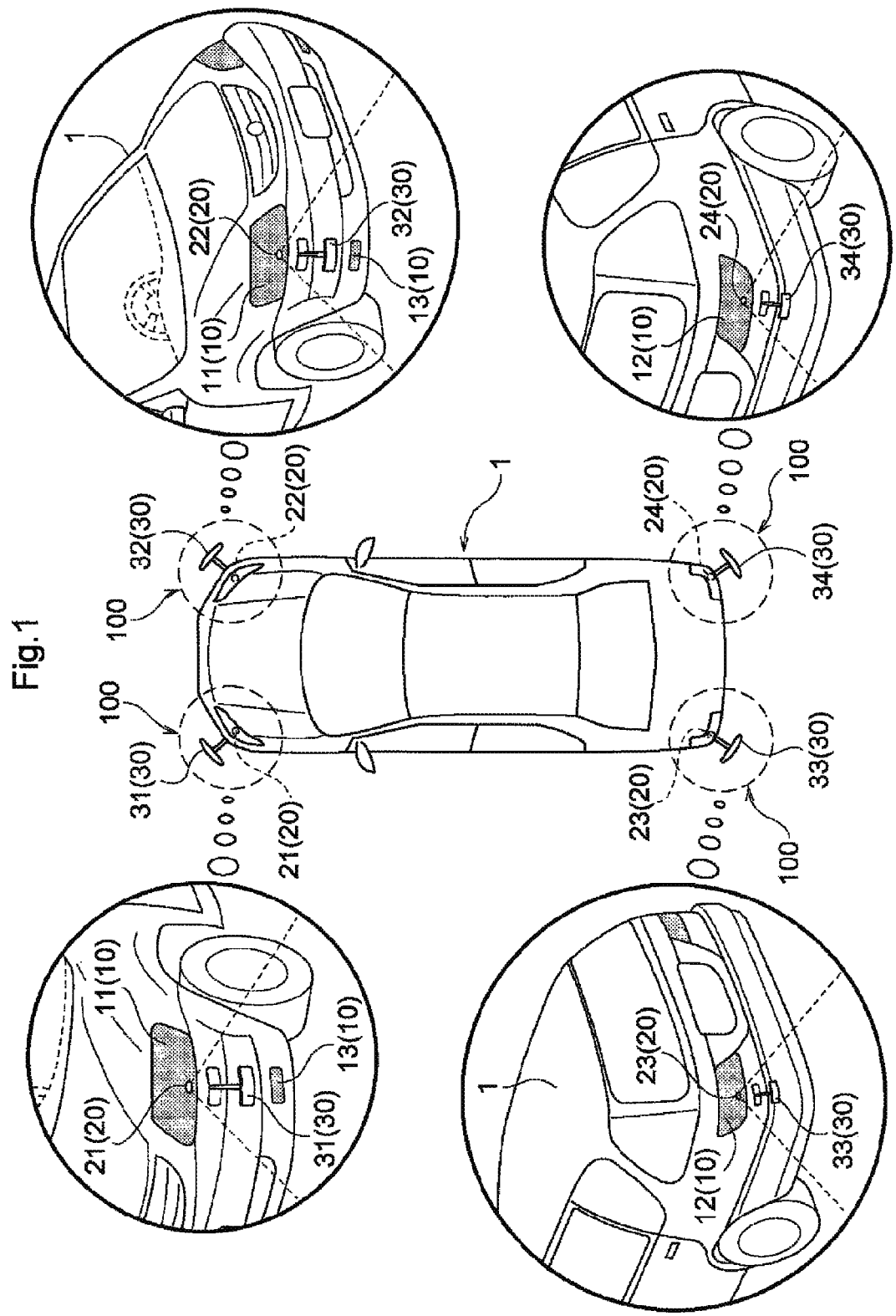

(51) Int. Cl.
*B60Q 1/00* (2006.01)
*B60Q 1/24* (2006.01)

(56) References Cited

FOREIGN PATENT DOCUMENTS

| JP | 2004-299557 A | 10/2004 |
| JP | 2004-312638 A | 11/2004 |
| JP | 2007-131162 A | 5/2007 |
| JP | 4231962 B2 | 3/2009 |

OTHER PUBLICATIONS

International Preliminary Report on Patentability for PCT/JP2012/064174 dated Jan. 7, 2014.
Extended European Search Report issued in European Application No. 12804475.7 dated Apr. 10, 2014.

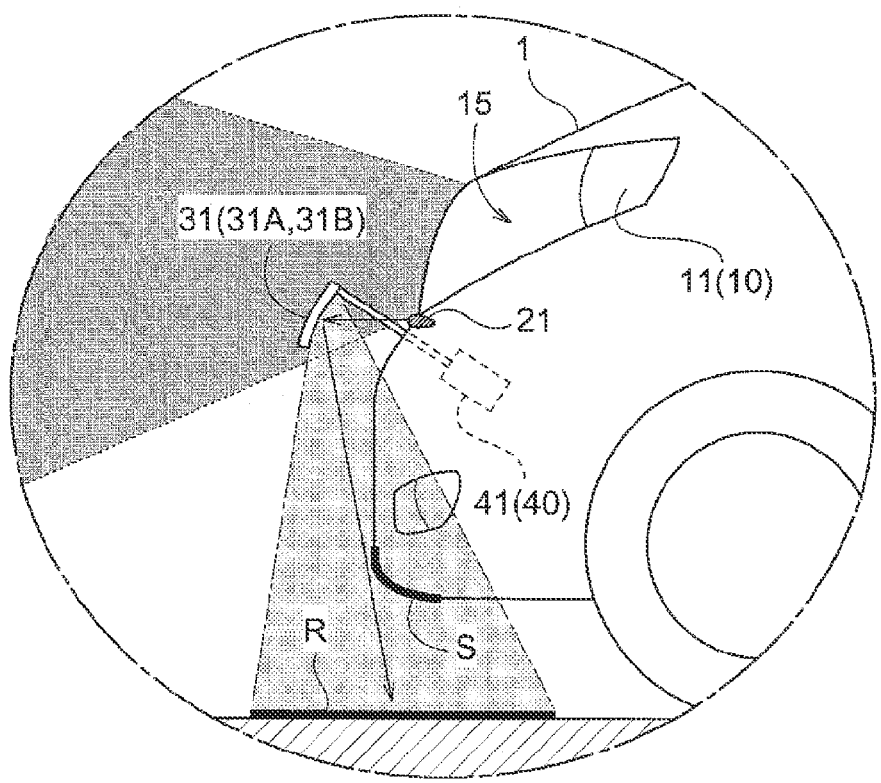
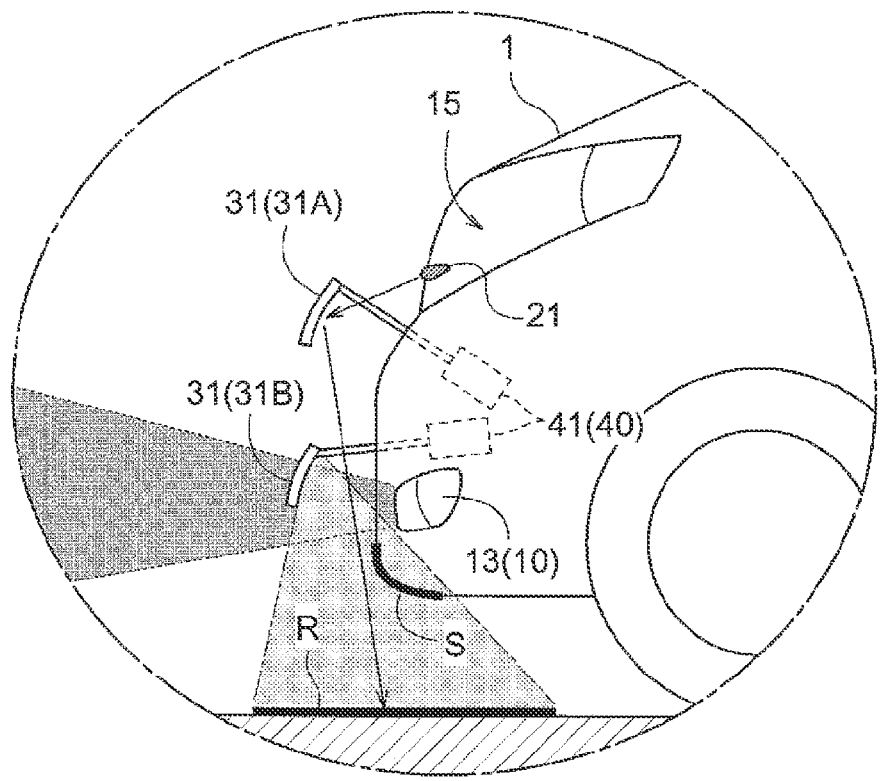

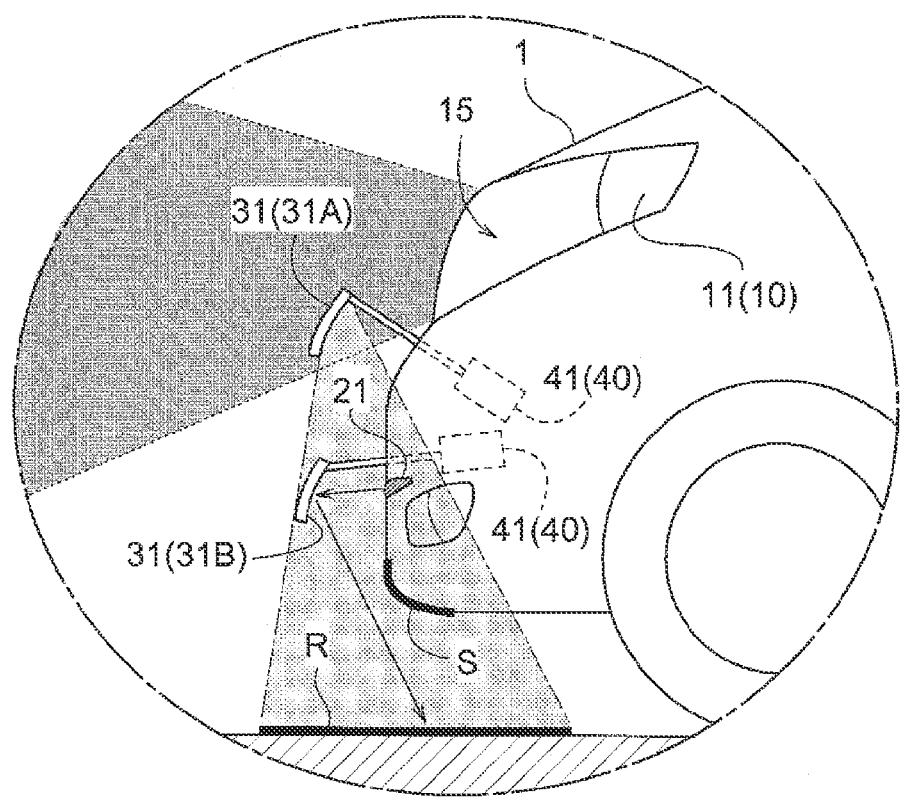

PERIPHERY MONITORING APPARATUS

CROSS REFERENCE TO RELATED APPLICATIONS

This application is a National Stage of International Application No. PCT/JP2012/064174, filed on May 31, 2012, which claims priority from Japanese Patent Application No. 2011-141910, filed on Jun. 27, 2011, the contents of all of which are incorporated herein by reference in their entirety.

TECHNICAL FIELD

The present invention relates to a periphery monitoring apparatus for monitoring the periphery of a vehicle.

BACKGROUND ART

Conventionally, there is an apparatus including a camera mounted in a vehicle in order to monitor the blind spot of the vehicle. As examples of techniques of this type, there are those disclosed in Patent Documents 1 and 2 identified below.

A vehicle drive assisting apparatus disclosed in Patent Document 1 is configured such that an in-vehicle camera capable of photographing the peripheral area of a vehicle, a light guiding means for guiding light from a photographic subject present at a position deviated from the optical axis of the in-vehicle camera to a photo detector of the in-vehicle camera, are housed in a light-transparent cover of a vehicle lamp unit. With this configuration, it is possible to photograph each of the left and right sides of the vehicle reflected in the light guiding means provided inside the transparent covers by the single in-vehicle camera.

A vehicle periphery monitoring apparatus disclosed in Patent Document 2 includes a reflector mirror disposed in front of a lamp unit for illuminating the outside of the vehicle and having a non-planar face, a photographing device having a lens face receiving light through the reflector mirror for photographing the periphery condition of the vehicle, and an incidence preventing means for preventing the irradiated light from the lamp unit from entering the photographing device when the lamp unit is lit. The incidence preventing means is provided in an optical path along which the irradiated light from the lamp unit travels through the reflector mirror to reach the photographing device. With this arrangement, it is made possible to photograph the blind spot portion of the vehicle, with preventing the irradiated light from passing toward the photographing device.

PRIOR ART DOCUMENTS

Patent Documents

Patent Document 1: Japanese Unexamined Patent Application Publication No. 2007-131162
Patent Document 2: Japanese Patent Publication No. 4231962

SUMMARY OF THE INVENTION

Object to be Achieved by Invention

The technique disclosed in Patent Document 1 is capable of photographing a wide area in the width direction of the self vehicle. However, as its photographing range is small in the length direction of the self vehicle, it is difficult to utilize this technique for checking the blind spots present on the lateral sides of the self vehicle. Also, the technique disclosed in Patent Document 2 involves an arrangement wherein the unit per se constantly projects, so there is the possibility of impairing the outer appearance of the vehicle. Further, as the unit is disposed in front of the lamp unit, the arrangement can interfere with irradiation by the lamp unit also.

In view of the above-described state of the art, the object of the present invention is to provide a periphery monitoring apparatus capable of photographing a vicinity of a vehicle.

Means for Achieving the Object

For achieving the above-noted object, according to the characterizing feature of a periphery monitoring apparatus relating to the present invention, the apparatus comprises: a light source configured to be provided in a vehicle for illuminating the periphery of the vehicle; and a camera photographing a condition of the periphery of the vehicle with an optical axis changed by a mirror toward the underside of a circumferential edge of the vehicle illuminated by at least a portion of light irradiated from the light source reflected by the mirror configured to be disposed on the outer side of the circumferential edge of the vehicle.

With the above-described characterizing feature, as a portion of light irradiated from the light source for illuminating the periphery of the vehicle is reflected by the mirror, the blind spots of the vehicle can be illuminated. Therefore, the apparatus can be realized at low costs, since there is no need for providing a new light source. Further, as the blind spot of the vehicle as the target of photography by the camera is illuminated, the vicinity of the vehicle can be clearly photographed even in the case of dim situation such as nighttime, twilight, etc. Further, through adjustment of the shape or size of the mirror for changing the optical axis of the camera, the camera can be formed compact. Hence, it becomes possible to employ an inexpensive camera. As described above, according to the present invention, the blind spot of the vehicle is photographed by the camera with illumination of this blind spot. Hence, it is possible to have the driver recognize an object present in the periphery of the vehicle.

Further, preferably, the optical axis changed by the mirror is configured to pass the light irradiated from the light source and reflected by the mirror.

With this arrangement, the photographic range covered by the camera can be illuminated by the light source. Hence, the vicinity of the vehicle can be photographed clearly even in a dim condition.

Further, preferably, a mirror reflecting the light from the light source and the mirror changing the optical axis are constituted of a same mirror.

With the above-described arrangement, as two mirrors are constituted of a same mirror, cost reduction can be realized.

Further, preferably, the camera is disposed on the inner side of the circumferential edge portion of the vehicle.

With the above-described arrangement, the camera will not come into contact with an object present in the periphery of the vehicle. Therefore, damage to the camera can be prevented.

Further, preferably, the camera is provided within a headlight unit of the vehicle having the light source.

With the above-described arrangement, there is no need for providing water proof treatment or dust proof treatment to the camera. Accordingly, cost reduction can be realized with possibility of prevention of deterioration of the camera.

Further, preferably, the apparatus further comprises a drive mechanism for causing the mirror reflecting the light from the light source to project along the circumferential direction beyond the circumferential edge of the vehicle.

With the above-described arrangement, the mirror can be projected automatically.

Further, preferably, the mirror reflecting the light from the light source is projected/retracted according to the speed of the vehicle.

With the above-described arrangement, the mirror does not project from the circumferential edge of the vehicle when not needed. Hence, the outer appearance of the vehicle is not impaired.

Further, preferably, the mirror comprises a non-planar mirror.

With the above-described arrangement, with use of the non-planar mirror, it becomes possible to adjust a misalignment if any between the camera and the optical axis. Therefore, even when there exists significant misalignment between the camera and the optical axis, with adjustment of this misalignment, the vicinity of the vehicle can be photographed clearly.

BRIEF DESCRIPTION THE DRAWINGS

Figure 2:
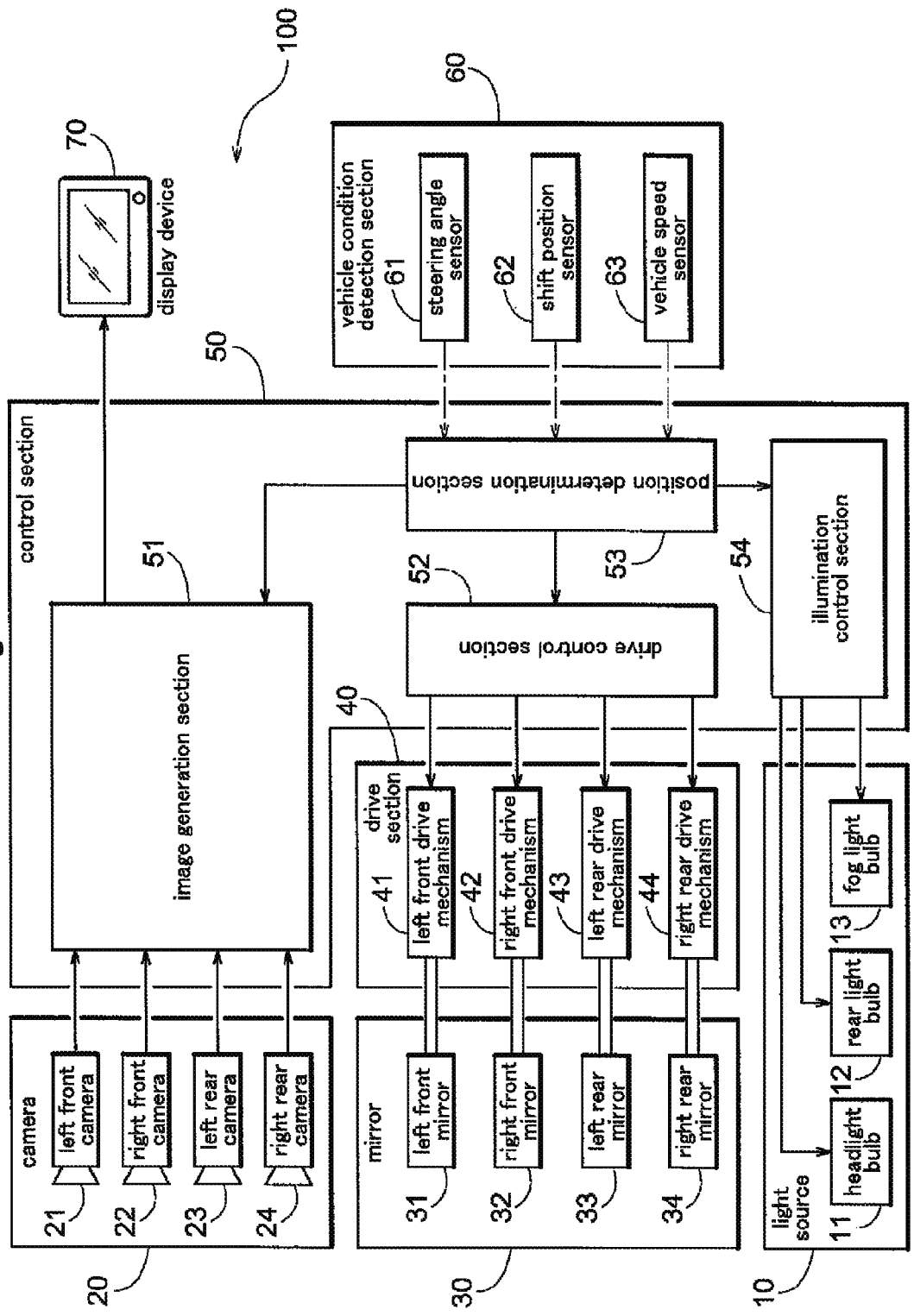
Figure 3:
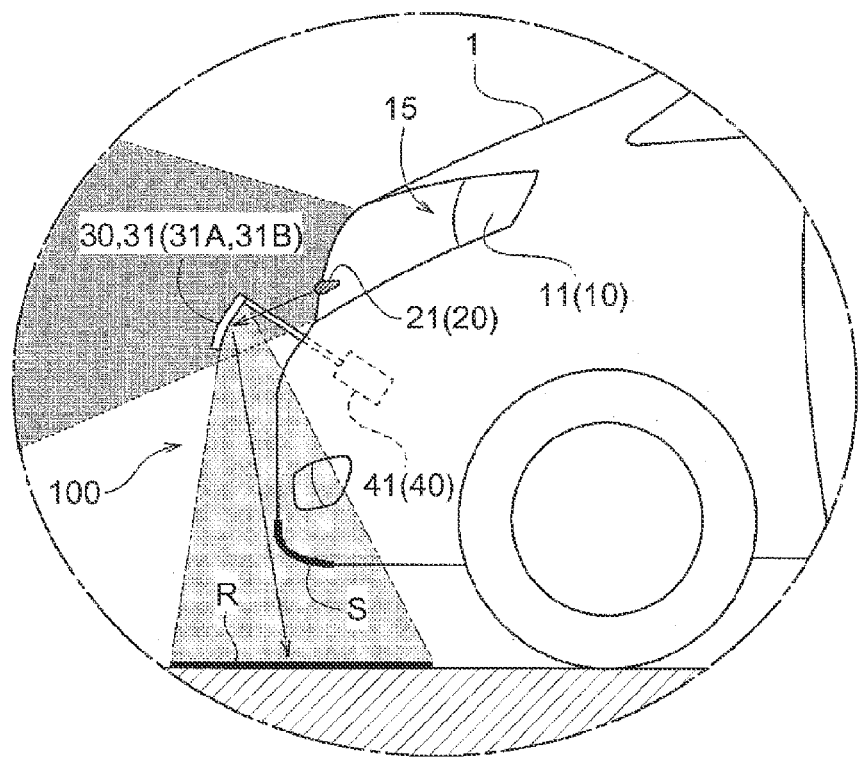
Figure 4:
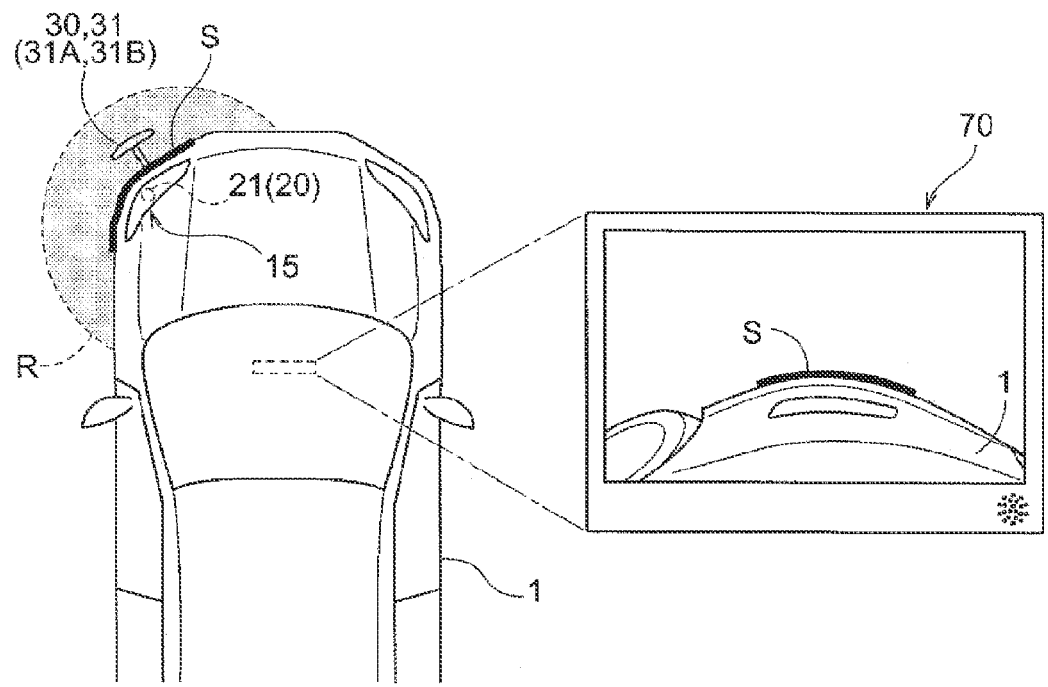
Figure 8:
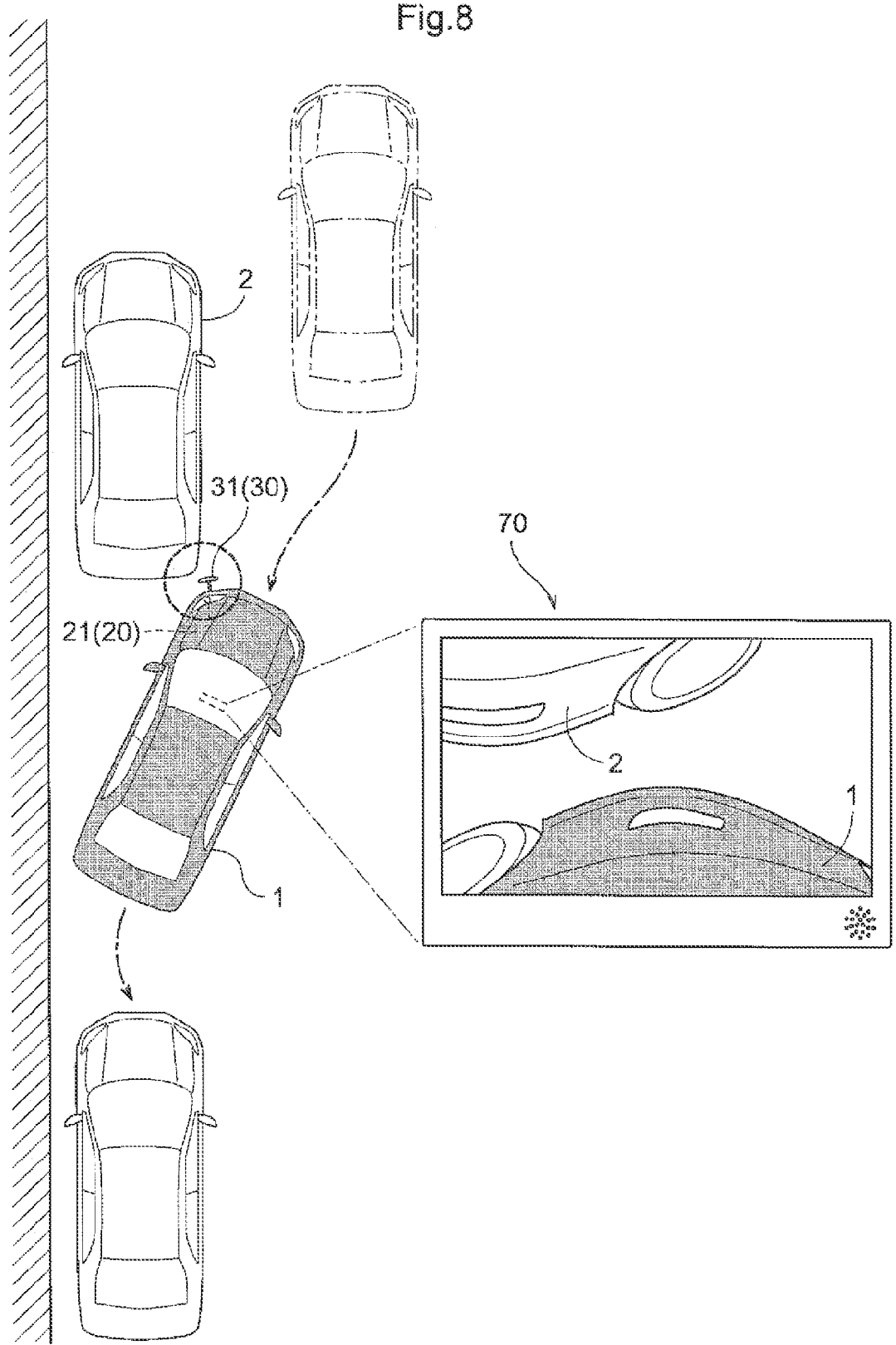

FIG. 1 is a plane view of a vehicle having a periphery monitoring apparatus,

FIG. 2 is a block diagram schematically showing the configuration of the periphery monitoring apparatus, FIG. 3 is a view showing an exemplary case when the left front portion of the vehicle is photographed by the periphery monitoring apparatus relating to a first embodiment, FIG. 4 is a view showing an exemplary case when the left front portion of the vehicle is photographed by the periphery monitoring apparatus relating to the first embodiment, FIG. 5 is a view showing with enlargement the left front portion of the vehicle having a periphery monitoring apparatus relating to a second embodiment, FIG. 6 is a view showing with enlargement the left front portion of the vehicle having a periphery monitoring apparatus relating to a third embodiment, FIG. 7 is a view showing with enlargement the left front portion of the vehicle having a periphery monitoring apparatus relating to a fourth embodiment, and FIG. 8 is a view showing a periphery monitoring image displayed on a display device relating to a further embodiment.

MODES OF EMBODYING THE INVENTION

First Embodiment

Next, an embodiment of the present invention will be explained with reference to the drawings. A periphery monitoring apparatus 100 relating to the present invention is provided in a vehicle 1 and has a function of photographing the circumferential edge portion of the vehicle 1 and a region including the perpendicularly downside of the circumferential edge portion. At the center of FIG. 1, there is shown a plane view of the vehicle 1 having such periphery monitoring apparatus 100. Further, around this plane view, there are shown perspective views which schematically show the four corners of the vehicle 1 (a left front portion, a right front portion, a left rear portion and a right rear portion of the vehicle 1). As shown in these drawings, in the instant embodiment, the periphery monitoring apparatus 100 is comprised of a camera 20 and a mirror 30 disposed at each of the four corners.

FIG. 2 is a block diagram schematically showing the configuration of the periphery monitoring apparatus 100. The periphery monitoring apparatus 100 includes respective functional units of a light source 10, the camera 20, the mirror 30, a drive section 40, a control section 50, a vehicle state detection section 60, and a display device 70. The above-described respective functional units are constituted of software and/or hardware comprising a CPU as a core component for effecting various operations for the periphery monitoring of the vehicle 1 for the sake of ease of driver's driving.

The light source 10 illuminates the periphery of the vehicle 1. More particularly, the light source 10 irradiates light toward the periphery of the vehicle 1. Such light source 10 corresponds to e.g. a light bulb 11 of a headlight or a light bulb 12 of a rear lamp of the vehicle 1. For instance, these light bulbs, as a matter of course, can be a light bulb 13 of a fog lamp though not shown. Each of the bulbs 11 and 12 has its light-on/light-out (illumination/dis-illumination) controlled by an illumination control section 54 to be described later.

The camera 20 photographs a situation or condition of the periphery of the vehicle 1. The camera 20 is provided at each of the left front portion, the right front portion, the left rear portion and the right rear portion of the of the vehicle 1 as described above and is comprised of a left front camera 21, a right front camera 22, a left rear camera 23 and a right rear camera 24. Each of these cameras 21-24 is constituted of e.g. a CCD camera or CIS (CMOS image sensor) or the like and effects a photographic operation in real time. An image obtained by photography is transmitted to an image generation section 51 which will be described later.

The mirror 30 too is provided, as described above, at each of the left front portion, the right front portion, the left rear portion and the right rear portion of the vehicle 1 and is comprised of a left front mirror 31, a right front mirror 32, a left rear mirror 33 and a right rear mirror 34.

Though will be detailed later, the drive section 40 causes each of these mirrors 31-34 to project. The drive section 40 is provided in correspondence with the respective mirrors 31-34. That is, the section 40 is comprised of a left front drive mechanism 41 for causing the left front mirror 31 to project, a right front drive mechanism 42 for causing the right front mirror 32 to project, a left rear drive mechanism 43 for causing the left rear mirror 33 to project and a right rear drive mechanism 44 for causing the right rear mirror 34 to project. Each of these drive mechanisms 41-44 is controlled by a drive control section 52 to be described later.

The vehicle condition detection section 60 detects at least one of a behavior and a condition of a driving operation of the vehicle 1. The vehicle condition detection section 60 is comprised of a steering angle sensor 61, a shift position sensor 62 and a vehicle speed sensor 63. The vehicle condition detection section 60 in the instant embodiment will be described as one for detecting both a behavior and a condition of a driving operation of the vehicle 1. The section detects vehicle information indicative of condition of the vehicle 1.

The steering angle sensor 61 detects a steering angle of a steering wheel (not shown) provided in the vehicle 1. Here, the language "steering angle" corresponds to a rotational angle formed when the steering wheel has been rotated clockwise or counter clockwise from its neutral condition. The term "neutral condition" refers to a condition where the direction of steerable wheels (not shown) provided in the vehicle 1 is parallel with the vehicle width, that is, a condition where the vehicle 1 can travel straight. The steering angle sensor 61 for detecting such rotational angle of the steering wheel can be comprised by using a hall effect sensor. A hall effect sensor is a device configured to detect a magnetic flux with utilization of the hall effect which produces an electromotive force according to a force received for moving an electric charge inside a conductor in the lateral direction when a magnetic field is applied to the conductor through which an electric current is flowing.

In the case of such hall effect sensor described above, preferably, permanent magnets are arranged around the rotational shaft of the steering wheel, so that the magnetic field that varies according to steering wheel rotation is detected by the hall effect sensor. Also, as the detection result outputted from the hall effect sensor is an electric signal, the steering angle sensor 61 calculates the steering angle of the steering wheel based on this detection result. And, a steering angle calculated by the steering angle sensor 61 is transmitted as steering information to a position determination section 53 which will be described later.

The shift position sensor 62 effects detection of a shift position of a shift lever (not shown) provided in the vehicle 1. The shift lever, in this embodiment, is a lever for effecting switchover of gears provided in an AT (Automatic Transmission) mechanism. Such AT mechanism includes a [P] range for use mainly at the time of parking wherein the drive line is locked in a speed changer, an [R] range for use in reversing, an [N] range where the inside of the speed changer is rendered to a free state and power of the engine is not transmitted to the drive line, a [D] range for use in normal traveling, a [2] range for use when the engine brake is used on a downslope, etc. and the upper limit of shift-up operation is fixed to the second speed, and a [1] range for use when strong engine brake is used on a steep downslope, etc. and the gear is fixed to the first speed. The AT mechanism is configured such that output voltages corresponding to these shift ranges can be outputted for the respective shift positions. And, the shift position sensor 62 is capable of detecting a current shift position through detection of this output voltage. The detection result of the shift position detected by the shift position sensor 62 is transmitted to the position determination section 53 to be described later.

The vehicle speed sensor 63 effects detection of a rotational speed of the traveling wheels (not shown) provided in the vehicle 1. The vehicle speed sensor 63 too is capable of detecting a rotational speed of the wheels by employing a hall effect sensor like the steering angle sensor 61 described above. Preferably, the vehicle speed sensor 63 is provided to e.g. the rotational shaft of the left front wheel and the rotational shaft of the right front wheel. With provision of the vehicle speed sensors 63 to the rotational shafts of both of the left and right wheels, it becomes possible to detect difference between a straight traveling and a turning. That is, if it is found that the rotational speeds of the left and right wheels are same, this can be determined as a straight traveling. If it is found that the rotational speeds of the left and right wheels differ from each other, this can be determined as a turning to the side of the lower rotational speed. Incidentally, it will suffice for the vehicle speed sensor 63 to be provided to at least one of the rotational shafts of the front wheels and the rear wheels provided in the vehicle 1. The detection result of the wheel speeds detected by the vehicle speed sensor 63 is transmitted to the position determination section 53 to be described later.

The control section 50 includes the image generation section 51, the drive control section 52, the position determination section 53, and the illumination control section 54. The position determination section 53 determines a position as the monitoring target based on the detection results of the steering angle sensor 61, the shift position sensor 62 and the vehicle speed sensor 63.

For instance, if the detection result by the shift position sensor 62 indicates that the shift lever is currently located at a shift position for use in forward traveling, the position determination section 53 determines a front position as the monitoring target position. If the detection result indicates that the shift lever is currently located at a shift position for use in reversing, the position determination section 53 determines a rear position as the monitoring target position.

Further, if the detection result by the steering angle sensor 61 indicates that the steering wheel has been rotated to the left, the position determination section 53 determines a right position as the monitoring target position. Whereas, if the detection result indicates that the steering wheel has been rotated to the right, the position determination section 53 determines a left position as the monitoring target position.

Moreover, if the detection result by the vehicle speed sensor 63 indicates a value over a preset value, the position determination section 53 determines that no monitoring is to be effected. Whereas, if the detection result indicates a value below the preset value, the position determination section 53 determines that monitoring is to be effected.

Based on these results, the position determination section 53 determines whether to effect monitoring or not and determines also a monitoring target position when monitoring is to be effected. Then, the position determination section 53 transmits the determined monitoring target position to the image generation section 51, the drive control section 52 and the illumination control section 54.

The drive control section 52 controls a corresponding drive mechanism so as to cause the mirror corresponding to the monitoring target position determined by the position determination section 53 to project. With this, the mirror located the monitoring target position will be projected.

If the position determination section 53 has determined that monitoring is to be effected, the illumination control section 54 causes the light bulb 11 of the headlight and the light bulb 12 of the rear lamp to illuminate. In the course of this, the light bulb to be illuminated can be at the position determined by the position determination section 53, that is, the bulb can be at only one of the front portion and the rear portion.

The image generation section 51 generates display image data based on an image obtained by the camera corresponding to the monitoring target position determined by the position determination section 53. The generated display image data is transmitted to the display device 70 to be displayed.

Next, the specific movements of the mirror 30 will be explained. The movements of the mirror 30 are same for the left front portion, the right front portion, the left rear portion and the right rear portion. Therefore, in the following, the left front mirror 31 will be explained as an example. FIG. 3 is a view showing the left front portion of the vehicle 1 with an enlargement. As shown in FIG. 3, the light source 10 corresponds to the light bulb 11 of the headlight of the vehicle 1.

The left front camera 21 (camera 20) is provided on the inner side of the circumferential edge portion of the vehicle 1. Here, the language "circumferential edge portion of the vehicle 1" refers to the outer edge portion of the vehicle 1 as seen in a plane view thereof like the FIG. 1 illustration. Therefore, the left front camera 21 (camera 20) is disposed so as not to project beyond the outer edge portion of the vehicle 1 in the plane view of the vehicle 1. In particular, in the example illustrated in FIG. 3, the left front camera 21 (camera 20) is disposed inside a headlight unit 15 of the vehicle 1 having the light source 10. Therefore, as the left front camera 21 (camera 20) can be provided within a sealed space, there is no need to provide the left front camera 21 (camera 20) with any water proof treatment or dust proof treatment. Therefore, cost reduction can be realized with the possibility of prevention of deterioration of the camera.

The left front mirror 31 (mirror 30) is comprised of a first mirror 31A and a second mirror 31B. The first mirror 31A reflects at least a portion of the light irradiated from the light source 10 to illuminate the circumferential edge portion of the vehicle 1. As described above, the light source 10 comprises the light bulb 11 of the headlight. Therefore, the light irradiated from the light source 10 becomes a portion of the light irradiated from the light source 10. The circumferential edge portion of the vehicle 1 is the outer edge portion as shown in the plane view, which is denoted with a mark S in FIG. 3. With the illumination of the circumferential edge portion S, the underside (region R) of this circumferential edge portion S is also illuminated. FIG. 4 shows these circumferential edge portion S and the region R as seen from the perpendicular upper side. As shown in FIG. 3 and FIG. 4, the first mirror 31A is disposed on the outer side of the circumferential edge portion S of the vehicle 1.

The first mirror 31A is caused by the left front drive mechanism 41 (drive section 40) to project in the circumferential direction beyond the circumferential edge portion S of the vehicle 1. The left front drive mechanism 41 includes an unillustrated actuator and the first mirror 31A is caused to project beyond the circumferential edge portion S by the actuator acting as the power source.

Inside the headlight unit 15, there is provided a reflector for reflecting the light from the light source 10. Therefore, the light from the headlight unit 15 has a certain degree of horizontal extension of a predetermined angle. Then, the light having such horizontal extension is reflected by the first mirror 31A projecting in the circumferential direction beyond the circumferential edge portion S and extended to the perpendicularly underside of the circumferential edge portion S, so that the circumferential edge portion S and the region R can be illuminated brightly.

The second mirror 31B changes the optical axis of the left front camera 21 toward the underside of the circumferential edge portion S of the vehicle 1. Here, the left front camera 21 is disposed inside the headlight unit 15 as described hereinbefore. Therefore, the optical axis of the left front camera 21 is oriented forwardly of the vehicle 1, and the second mirror 31B changes this optical axis to the direction of the circumferential edge portion S. With this, the left front camera 21 photographs the situations of the circumferential edge portion S and the region R reflected in the second mirror 31B.

In the instant embodiment, the first mirror 31A and the second mirror 31B are comprised of a same mirror. With this, cost reduction can be realized. In the following discussion, except for a case where some special distinction is needed, these mirrors will be explained collectively as the left front mirror 31. The left front mirror 31 can employ a planar mirror, but in case there exists significant misalignment between the left front camera 21 and the light source 10, the left front mirror 31 can be comprised of a non-planar face (e.g. a convex face). In the case of the mirror comprised of a non-planar mirror, it will be preferred for the above-described image generation section 51 to effect a known image processing on the image photographed by the left front camera 21 for eliminating distortion therefrom.

The left front mirror 31 (mirror 30) is configured to be projected/retracted according to the speed of the vehicle 1. The term "projected/retracted" refers to projection and retraction. Here, the left front mirror 31 is caused to project by the left front drive mechanism 41 as described hereinbefore. And, its retraction too is effected by the left front drive mechanism 41. More particularly, the left front mirror 31 is projected when the speed of the vehicle 1 becomes below a preset value and is retracted when the speed of the vehicle 1 becomes greater than the preset value. This control can be effected by the left front drive mechanism 41 based on detection result of the vehicle speed sensor 63. Incidentally, with using a known technique, the control will be effected so as not to project the left front mirror 31 (mirror 30) during a low speed traveling due to simple traffic congestion or the like.

Next, the image to be displayed by the display device 70 will be explained. FIG. 4 shows one example of such image displayed by the display device 70. As shown by this image, with the periphery monitoring apparatus 100, it is possible to appropriately photograph a blind spot of the vehicle 1. As described above, the inventive periphery monitoring apparatus 100 obtains an image of the vehicle 1 as seen from the outer side in the circumferential direction of the vehicle 1 because the camera 20 effects photography with orientation toward the circumferential edge portion S side of the vehicle 1 via the mirror 30. Therefore, the image will contain a portion of the vehicle 1 as shown by the exemplary image to be displayed on the monitor device 70 in FIG. 4. Such image as above showing the vehicle 1 as seen from the outside will be displayed on the display device 70. Based on this image, the driver of the vehicle 1 will visually confirm the immediate vicinity of the vehicle 1 and can readily grasp the distance between the vehicle 1 and an object present in the periphery of this vehicle 1.

As described above, with the inventive periphery monitoring apparatus 100, by reflecting a portion of the light source 10 for illuminating the periphery of the vehicle 1 by the mirror 30, it is possible to illuminate a blind spot of the vehicle 1. Therefore, there is no need to provide any additional light source 10, so that the apparatus can be realized at low costs. Further, as the blind spot of the vehicle 1 as the photographic object of the camera 20 is illuminated, it is possible to photograph the vicinity of the vehicle 1 clearly even when it is dim such as in a nighttime or twilight. Further, through adjustment of the shape and size of the mirror 30 for changing the optical axis of the camera 20, the camera 20 can be formed compact. Accordingly, it is possible to employ an inexpensive camera 20. As described above, according to the present invention, since a blind spot of the vehicle 1 is photographed by the camera 20 with illumination of this blind spot, it becomes possible to cause the driver to recognize an object present in the periphery of the vehicle 1.

Second Embodiment

Next, a second embodiment of the inventive periphery monitoring apparatus 100 will be explained. In the first embodiment, it was explained that the left front camera 21 is provided inside the headlight unit 15. The left front camera 21 relating to the instant embodiment differs from the first embodiment in that this camera 21 is not provided inside the headlight unit 15. FIG. 5 is a view showing with enlargement the left front portion of the vehicle 1 having a periphery monitoring apparatus 100 relating to this embodiment.

As shown in FIG. 5, the left front camera 21 is provided outside the headlight unit 15. With this arrangement too, by using a convex mirror as the left front mirror 31, it is possible for the left front camera 21 to photograph the circumferential edge portion S of the vehicle 1 and the region R including the perpendicularly downside of this circumferential edge portion S.

Third Embodiment

Next, a third embodiment of the inventive periphery monitoring apparatus 100 will be explained. In the first embodiment, it was explained that the first mirror 31A and the second mirror 31B were co-used. This embodiment differs from the first embodiment in that the first mirror 31A and the second mirror 31B are not co-used. FIG. 6 is a view showing with enlargement the left front portion of the vehicle 1 having a periphery monitoring apparatus 100 relating to this embodiment.

As shown in FIG. 6, the first mirror 31A and the second mirror 31B are provided separately. The first mirror 31A bends the light from the light source 10 and the second mirror 31B changes a portion of the light from a light bulb 13 of a fog lamp as the optical axis of the left front camera 21. Projection and retraction of each of these mirrors 31A, 31B are effected by the left front drive mechanism 41. The left front drive mechanism 41 can be an integrated mechanism for both projection/retraction of the first mirror 31A and projection/retraction of the second mirror 31B, or can be provided as separate mechanisms, one for the projection/retraction of the first mirror 31A and the other for the projection/retraction of the second mirror 31B. With this arrangement too, it is possible for the left front camera 21 to photograph the circumferential edge portion S of the vehicle 1 and the region R including the perpendicularly downside of this circumferential edge portion S.

Fourth Embodiment

Next, a fourth embodiment of the inventive periphery monitoring apparatus 100 will be explained. In the first embodiment, it was explained that the first mirror 31A and the second mirror 31B were co-used and the left front camera 21 is provided inside the headlight unit 15. This embodiment differs from the first embodiment in that the first mirror 31A and the second mirror 31B are not co-used and also in that the left front camera 21 is not disposed inside the headlight unit 15. FIG. 7 is a view showing with enlargement the left front portion of the vehicle 1 having a periphery monitoring apparatus 100 relating to this embodiment.

As shown in FIG. 7, the first mirror 31A and the second mirror 31B are provided separately. The first mirror 31A bends the light from the light source 10 and the second mirror 31B changes the optical axis of the left front camera 21. Projection and retraction of each of these mirrors 31A, 31B are effected by the left front drive mechanism 41. The left front drive mechanism 41 can be an integrated mechanism for both projection/retraction of the first mirror 31A and projection/retraction of the second mirror 31B, or can be provided as separate mechanisms, one for the projection/retraction of the first mirror 31A and the other for the projection/retraction of the second mirror 31B. Further, the left front camera 21 is provided outside the headlight unit 15. With this arrangement too, it is possible for the left front camera 21 to photograph the circumferential edge portion S of the vehicle 1 and the region R including the perpendicularly downside of this circumferential edge portion S.

Other Embodiments

In the first embodiment, it was explained that in case the light source 10 comprises the light bulb 11 of the headlight, the camera 20 is provided inside the headlight unit 15. However, the range of application of the present invention is not limited thereto. In case the light source 10 comprises the light bulb 13 of the fog lamp, the camera 20 can be provided inside the fog lamp unit as a matter of course. Further, in case the light source 10 comprises the light bulb 12 of the rear lamp, the camera 20 can be provided inside the rear lamp unit as a matter of course.

In the foregoing embodiment, it was explained that the camera 20 is provided on the inner side of the circumferential edge portion S of the vehicle 1. However, the range of application of the present invention is not limited thereto. The camera 20 can also be provided on the outer side of the circumferential edge portion S of the vehicle 1 as a matter of course. In such case, it is also possible as a matter of course to eliminate the drive section 40 for causing the first mirror 31A and the second mirror 31B to project in the circumferential direction beyond the circumferential edge portion S of the vehicle 1.

In the foregoing embodiment, it was explained that the first mirror 31A and the second mirror 31B project or retract according to the speed of the vehicle 1. However, the range of application of the present invention is not limited thereto. It is also possible as a matter of course to employ an arrangement in which the mirrors project or retract in response to e.g. an operation on a touch panel by the driver of the vehicle 1, rather than according to the speed of the vehicle 1.

In the foregoing embodiment, it was explained that the camera 20 and the mirror 30 are provided at the left front portion, the right front portion, the left rear portion and the right rear portion of the vehicle 1, respectively. However, the range of application of the present invention is not limited thereto. The camera 20 and the mirror 30 can be provided at the front portion or rear portion of the vehicle 1. Or, they can be provided at the left portion or right portion of the vehicle 1. Or, they can be provided only at a predetermined position of the vehicle 1 as a matter of course.

In the foregoing embodiment, an explanation was made with using a passenger automobile as the vehicle 1. However, the range of application of the present invention is not limited thereto. For instance, the invention can be applied also to a large vehicle such as a bus, a truck, etc. or can be applied to a heavy machinery or the like as a matter of course.

In the foregoing embodiment, it was explained that the display device 70 displays an image of a portion of the vehicle 1 photographed by the camera 20. However, the range of application of the present invention is not limited thereto. For instance, an image obtained by synthesizing an image obtained by the camera 20 with an image picture of the vehicle 1 can be displayed also. Here, the term "image picture" of the vehicle 1 means a pre-stored image picture, not an image actually obtained by the camera 20. Further, the image picture can be a portion of a bird's eye view image of the vehicle 1 for instance. In the case of synthesis of a portion of an image picture of a portion of the vehicle 1 also, it is possible as a matter of course to allow the driver of the vehicle 1 to readily grasp the distance between the vehicle 1 and an object present in the periphery of the vehicle 1 included in the image.

Further, it is also possible as a matter of course to effect a viewpoint conversion on the image actually obtained by the camera 20 to a viewpoint from the perpendicularly upward and to display this converted image on the display device 70.

In the foregoing embodiment, it was explained that the periphery monitoring apparatus 100 includes the light source 10 provided in the vehicle 1 for illuminating the periphery of this vehicle 1 and the camera 20 for photographing situation of the periphery of the vehicle 1 with an optical axis changed by the mirror 30 provided on the outer side of the circumferential edge portion S of the vehicle 1, toward the downward of the circumferential edge portion S of the vehicle 1 illuminated by illumination of at least a portion of the light source 10 reflected by the mirror 30. That is, the periphery monitoring apparatus 100 includes the light source 10 provided in the vehicle 1 for illuminating the periphery of this vehicle 1, the camera 20 for photographing a situation of the periphery of the vehicle 1, the first mirror 31A for bending the light irradiated from the light source 10 toward the circumferential edge portion S side of the vehicle 1, and the second mirror 31B for changing the optical axis of the camera 20 toward the circumferential edge portion S side. Here, the first mirror 31A and the second mirror 31B can be comprised of a same mirror like the first embodiment and the second embodiment. Or, like the third embodiment and the fourth embodiment, the first mirror 31A and the second mirror 31B can be provided as separate mirrors.

According to the explanation given in the foregoing embodiment, if the shift position sensor 62 detects that the shift lever is located at a shift portion used at the time of forward traveling, the position determination section 53 determines the front portion as the monitoring target position; whereas, if the shift position sensor 62 detects that the shift lever is located at a shift position used at the time of reversing, the position determination section 53 determines the rear portion as the monitoring target position. However, the range of application of the present invention is not limited thereto. For instance, in the case of parallel parking, even in the case of reversing of the vehicle 1, a blind spot present on the front side can be displayed as a matter of course. In such case, it is possible to arrange such that the displaying is realized in response to an operation by the driver of the vehicle 1 on a predetermined switch (e.g. a switch displayed on the monitor screen in case the display device 70 is a touch panel). With this arrangement, as shown in FIG. 8, when the vehicle 1 is reversed with rotating the steering wheel to the right, with displaying of the left front portion on the display device 70, contact with another vehicle 2 can be prevented.

In the foregoing embodiment, it was explained that the light bulb 12 of the rear lamp can be used as one light source of the vehicle 1. However, the range of application of the present invention is not limited thereto. For instance, it is possible also as a matter of course to provide a lamp dedicated to illumination of the rear side of the vehicle 1 for instance. In such case, brighter illumination than that provided by a rear lamp can be provided.

INDUSTRIAL APPLICABILITY

The present invention may be applied to a periphery monitoring apparatus for monitoring the periphery of a vehicle.

DESCRIPTION OF REFERENCE MARKS/NUMERALS

1: vehicle
10: light source
15: headlight unit
20: camera
30: mirror
40: drive section
100: periphery monitoring apparatus
S: circumferential edge portion

The invention claimed is:

1. A periphery monitoring apparatus comprising:
a light source configured to be provided in a vehicle for illuminating the periphery of the vehicle; and
a camera provided within a headlight unit of the vehicle having the light source photographing a condition of the periphery of the vehicle with an optical axis of the camera changed by a mirror toward the underside of the circumferential edge of the vehicle illuminated by at least a portion of light irradiated from the light source reflected by the mirror configured to be disposed on the outer side of the circumferential edge of the vehicle.

2. The periphery monitoring apparatus according to claim 1, wherein the optical axis changed by the mirror is configured to pass the light irradiated from the light source and reflected by the mirror.

3. The periphery monitoring apparatus according to claim 1, wherein the mirror comprises a first mirror reflecting the light from the light source and a second mirror changing the optical axis of the camera.

4. The periphery monitoring apparatus according to claim 1, wherein the camera is disposed on the inner side of the circumferential edge portion of the vehicle.

5. The periphery monitoring apparatus according to claim 1, further comprising a drive mechanism causing the mirror for reflecting the light from the light source to project along the circumferential direction beyond the circumferential edge of the vehicle.

6. The periphery monitoring apparatus according to claim 5, wherein the mirror reflecting the light from the light source is projected/retracted according to the speed of the vehicle.

7. The periphery monitoring apparatus according to claim 1, wherein the mirror comprises a non-planar mirror.

* * * * *